United States Patent [19]

Mikota

[11] Patent Number: 4,608,828
[45] Date of Patent: Sep. 2, 1986

[54] SUPERCHARGED FOUR-STROKE ENGINE WITH SINGLY VALVED CYLINDERS AND PASS-AROUND OF COMPRESSED AIR

[75] Inventor: Thomas I. Mikota, Friedberg, Fed. Rep. of Germany

[73] Assignee: M.A.N. Maschinenfabrik Augsburg-Nürnberg Aktiengesellschaft, Augsburg, Fed. Rep. of Germany

[21] Appl. No.: 593,361

[22] Filed: Mar. 26, 1984

[30] Foreign Application Priority Data

Mar. 30, 1983 [DE] Fed. Rep. of Germany ....... 3311626

[51] Int. Cl.⁴ .............................................. F02B 37/00
[52] U.S. Cl. .................................... 60/606; 123/79 R
[58] Field of Search ............... 60/605, 606; 123/79 R, 123/559

[56] References Cited

U.S. PATENT DOCUMENTS

| 2,107,389 | 2/1938 | Price et al. | 123/79 R |
| 3,093,959 | 6/1963 | Birmann | 60/605 |
| 3,590,791 | 7/1971 | Roosa | 123/79 R |

FOREIGN PATENT DOCUMENTS

| 1526443 | 9/1970 | Fed. Rep. of Germany | 60/605 |
| 2802118 | 11/1978 | Fed. Rep. of Germany | 60/605 |

OTHER PUBLICATIONS

K. Zinner "Aufladung von Verbrennungsmotoren", pp. 45, 352, 353, published by Springer-Verlag Berlin, Heidelberg, New York.
"Hütte des Ingenieurs Taschenbuch" (Engineer's Handbook), p. 720, Berlin 1954 published by Verlag von Wilhelm Ernst & Sohn.

*Primary Examiner*—Michael Koczo
*Attorney, Agent, or Firm*—Frishauf, Holtz, Goodman & Woodward

[57] ABSTRACT

Each cylinder of a supercharged four-stroke internal combustion engine is provided with a multi-purpose duct which passes from the compressed air manifold to the exhaust manifold and has a short branch within the cylinder head structure leading directly downward to connect with the cylinder where a single valve is provided to admit intake air and pass out exhaust gas. The multi-purpose duct curves around in a part of a spiral above the cylinder near the branching place and enters laterally in the portion of the duct that leads off to the exhaust manifold, so that a relatively high resistance to flow keeps the pressure in the compressed air duct from being unduly diminished while flow of air bypassing the cylinder between the compressed air and the exhaust ducts serves to increase the amount of working gas in the supercharger. The duct is shaped so as to keep very low the resistance to the flow of air into the cylinder and the flow of exhaust gas out of the cylinder. In one embodiment butterfly throttle valves are provided at the inlet ends of the respective multi-purpose ducts, which are closed in a cyclical pattern to reduce the air flow between manifolds while the respective ducts are not serving the intake and exhaust operations of the particular cylinders to which they are connected.

14 Claims, 13 Drawing Figures

SUPERCHARGED FOUR-STROKE ENGINE WITH SINGLY VALVED CYLINDERS AND PASS-AROUND OF COMPRESSED AIR

The invention concerns a four-stroke multicylinder supercharged internal combustion engine with a supercharger driven at least in part by engine exhaust gas, having an aircharging manifold connected for supplying air from the supercharger to the engine cylinders for combustion of fuel injected therein, an exhaust gas collecting manifold connected to the cylinders and to the supercharger for driving the latter and ducts interconnecting the manifolds and valved ports of the cylinders.

SUMMARY OF THE INVENTION

It is the object of this invention to provide a supercharged four-stroke internal combustion engine of more compact structure than conventional four-stroke engines, having fewer moving parts, capable of operation on heavier petroleum distillates and having better efficiency and greater reserve power in partial load operation and in acceleration.

Briefly, these objectives are achieved by providing ducts interconnecting the manifolds and the valved ports of the cylinders, one for each cylinder serving not only to remove the exhaust and replace it with compressed air ready for fuel injection, but also to bypass a limited amount of compressed air to the exhaust manifold that does not pass through the cylinder and advantageously increases the operating quantity of gas in the supercharger, and may also improve the effectiveness of the gas replacement operation in the cylinder when, as in the structure of the present invention, a single valved port in the cylinder head, connected to the duct system just mentioned by a short branch channel, is used both for air intake and exhaust discharge. The ducts serving the respective cylinders in the manner just described are accordingly referred to herein as "blow-around" ducts because they each complete a loop which begins at the air intake of the supercharger and ends at the exhaust discharge of the supercharger, this loop being complete both for the air that is charged into the cylinder for a compression stroke and then discharged after a power stroke and for the air that bypasses the cylinder only during certain portions of the piston cycle in the particular cylinder. The term "blow-around" is additionally appropriate because the ducts typically have a curved course within the cylinder head structure for obtaining gas flow characteristics favorable for efficient operation of the engine.

These gas flow characteristics involve producing in the by-pass path a resistance to air flow such that when the valve is closed, a suitably limited amount of air can pass and also providing that when the valve is open, there will be very low resistance to flow of air from the air-charging manifold into the cylinder during an intake stroke in the cylinder and very little resistance for gas flowing out of the cylinder into the exhaust manifold during an exhaust stroke in the cylinder.

Compared to a conventional supercharged engine, the present engine has remarkable advantages. An engine power/speed characteristic is obtainable by the invention which provides substantially greater flexibility of application of such an engine compared to a conventional statically or dynamically supercharged motor. Only low requirements are placed on the supercharger efficiency for producing great power reserves, enabling the engine to operate well both under partial load and during acceleration.

The features of the invention make possible a design of an engine for a particular load-carrying vehicle, or other load-moving objective without the necessity of accepting disadvantages in operation when the full load capability is not required. Reduction of fuel consumption results in the case of the engine of the present invention in various respects, for example from the reduction of mechanical losses compared to conventional four-stroke engines with a larger number of moving parts and likewise, the reduction of energy consumption in the recharging of the cylinder, which also leads to lower fuel consumption. Moreover, the construction of the machine, according to the invention, provides an optimum establishment of a course of combustion with regard to a combustion chamber shape designed without the sacrifices of compromise, a favorable compression ratio and an advantageous combustion mixture formation. The construction of the engine according to the invention quite decisively improves the tolerance of the engine for fuel quality that contemporaneously tends to deteriorate, i.e., the internal combustion engine according to the invention is notable for being operable with relatively heavier distillates as fuel. Furthermore, the distinct lowering of the average temperature found in operation of an engine according to the invention improves the operating conditions of the valve through which the exhaust gas flows, which is known to be a problematic component.

BRIEF DESCRIPTION OF THE DRAWING

Further details of the engine of the present invention, and particularly of the shape and size of the blow-around ducts thereof and the valves for permitting by-pass air to flow only during certain portions of the piston cycle of the particular cylinder, are made clear in the description given below that refer to the annexed drawings, all of the figures of which are in highly schematic form, and in which.

In the several figures, identical or closely corresponding parts of the supercharged four-stroke engines respectively shown are designated with the same reference numerals.

DESCRIPTION OF THE ILLUSTRATED EMBODIMENTS

All of the figures are highly schematic and they show only the parts of a supercharged four-stroke internal combustion engine which are necessary to be shown for understanding of the invention. The engine, itself, is designated 1, the individual cylinders themselves are each designated 2, while the reference numeral 3 identifies a piston in the cylinder and the cylinder head structure at the top of the cylinder is shown as 4.

The engine 1 operates with fuel injected directly into the cylinders 2 and they operate either with self-ignition (from the heat of compression, with or without help of a glow-plug) or by ignition initiated externally producing a spark in the cylinder.

The fuel can be liquid or gaseous or even a powdered solid, or can be provided by a combination of liquid, gaseous and/or solid materials.

The supercharged four-stroke engine 1 has a supercharging assembly 5 that contains at least one exhaust-driven turbosupercharger and possibly several of them connected in series or in parallel, but it is also possible to equip it, for purposes of the invention, with other types of charging apparatus, for example, one or more pressure wave chargers. To the extent that it may be necessary or desirable, the supercharging assembly can include an external drive, either for delivery to the engine of sufficient compressed air from the time of starting the engine until the load lightens somewhat or for assuring some other kind of support for the operation of the engine. The external drive 6 normally involves one or more electic motors, the number depending on the number of superchargers provided or blowers connected in series or in parallel with the compressor or compressors of the supercharging equipment 5. A charging air manifold 7 is connected to the supercharging assembly 5 into which manifold the compressed air for supporting combustion in the cylinders 2 is fed. It is connected to the supercharging equipment 5 either directly or through a charging air cooler 8. Similarly, an exhaust manifold 9 is provided for accepting the exhaust gas intermittently forced out of the cylinders 2 and supplying it to the drive side of the superchargers.

Figure 1:
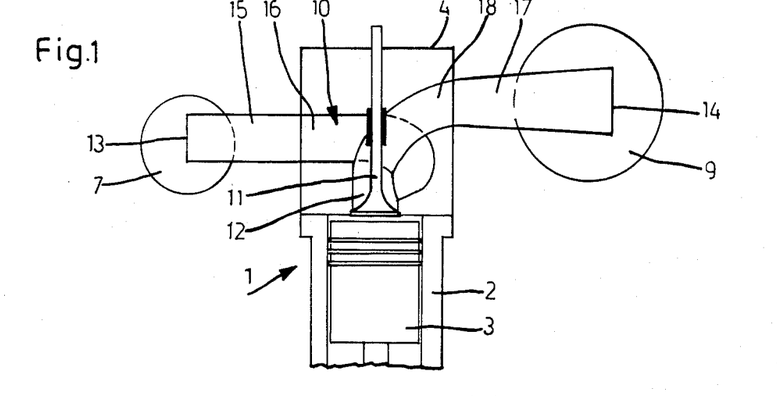
FIGS. 1 and 2 are respectively an end view and a partial top view of a first embodiment of a supercharged four-stroke engine for explaining the invention.

In order to carry out the objects of the present invention the various illustrative embodiments of four-stroke internal combustion engines according to the invention are constructed as more particularly described below, beginning with FIG. 1.

A blow-around duct, generally designated 10 as a whole, is provided for each of the cylinders 2 of the engine 1. The duct 10 in each case leads through the cylinder head 4 of the cylinder 2 and provides a direct connection between the charging air manifold 7 and the exhaust manifold 9. Charging air is continuously or intermittently directed through this blow-around duct 10 from the air manifold 7 to the exhaust manifold 9 for increasing the effective quantity of working gas in the supercharging assembly 5, represented by the sum of the amount of air blown directly around the loop, by-passing the cylinders and the amount of exhaust gas delivered by these cylinders.

Each of the blow-around ducts 10, in addition, supplies the necessary air for combustion in a cylinder 2 through a gas-change channel 12 branching off from it, controlled by a single gas-changing valve 11. The exhaust gases coming out from each cylinder 2 are also led away through the respective blow-around ducts 10 to the exhaust manifold 9. In order that each of the blow-around ducts 10 can perform the multiple function just described, each of these ducts, within the cylinder head 4 in the region before and after the branching place of the corresponding gas-channel 12, has a shape and size producing a certain resistance to flow; in this regard each blow-around duct 10 is so constituted that (a) charging air from the manifold 7 can flow in limited quantity to the exhaust manifold 9 when the gas-change valve 11 is closed, (b) when the gas-change valve 11 is open, charging air from the manifold 7 can flow with little resistance thereto into the cylinder 2, especially during the intake stroke of the piston within the cylinder, and (c) when the gas-change valve 11 is open, exhaused gas can flow out from the cylinder 2 against little resistance to the exhaust manifold 9, especially during the exhaust stroke of the piston.

Before describing in detail the various possible configurations, in accordance with the invention, of the blow-around ducts 10, three individual portions or sections of such a duct are defined. The entrance plane at the charging air manifold end of the duct is designated 13 and the exit plane at the exhaust manifold end of the duct is designated 14. That portion of each blow-around duct that extends from the branch-off location of the gas-change channel 12 over to the entrance plane 13 at or in the air manifold has the designations 15 and 16 the former designating the section running outside of the cylinder head 4 and 16 designating the section running inside the cylinder head 4. That part of blow-around duct 10 that runs from the branching place of the gas change channel 12 to the exit plane 14 at or in the exhaust manifold is similarly designated 17 and 18, the designation 17 applying to the portion outside the cylinder head 4 and 18 designating the section inside the cylinder head 4.

The short gas-change channel 12 branching off from each blow-around duct 10 runs preferably coaxially to the longitudinal axis of the gas-changing valve 11. Preferably, the axis of the gas-change channel 12 and the axis of the above-defined portion 17,18 of the blow-around duct 10 lie in a plane in which the longitudinal axis of the gas-changing valve 11 also lies. The portion 18 of each blow-around duct 10, lying within the cylinder head 4, is bent around an arc and has a streamline transition blending into the short gas change channel 12. The portion 16 of each blow-around duct 10 is wound around in a spiral curve within the cylinder head 4 above the branching place of the gas-change channel 11 and opens from the side into the portion 18 of the blow-around duct 10. In consequence the bent around course of the blow-around duct 10 in the region of the branching place of the gas-change channel 12 provides the resistance to flow which is of the character necessary for the desired operation of renewing the charge of the cylinder.

Figure 5:
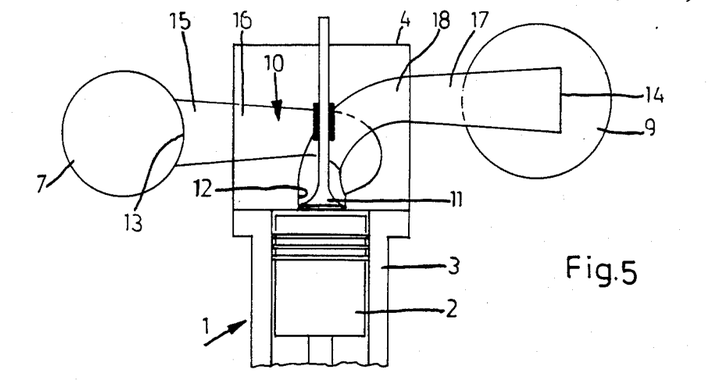
FIGS. 5 and 6 are similar corresponding views of a third embodiment of a four-stroke engine for explaining the invention.
Figure 6:
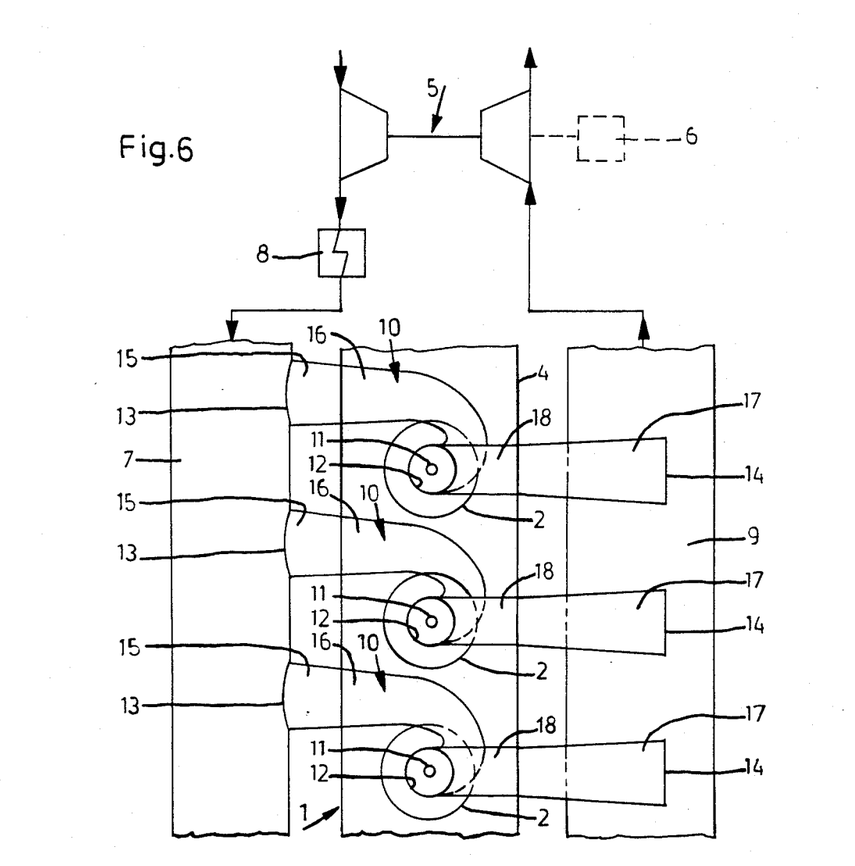

On the inlet side, each of the blow-around ducts 10 can project into the air-charging manifold 7 as shown in the examples of FIGS. 1 and 2, 7 and 8 and 9 and 10. On the other hand, as shown in FIGS. 3 and 4, 5 and 6 and 11 and 12, the blow-around duct can simply branch off externally from the manifold 7. Furthermore, each duct 10, shown in all but one of the illustrated embodiments can have a uniform cross-section at least between the entrance plane 17 at the manifold 7 and the entrance into the portion 15 lying within the cylinder head 4. As shown in FIGS. 5 and 6, however, it is also possible for the blow-around duct 10 to be progressively tapered down in cross-section from its entrance plane 13 at the manifold 7. Preferably the volume of each blow-around duct 10 in the region extending from the entrance plane 13 at the manifold 7 over to the branching place of the gas-change channel 12 is such that it corresponds to 0.7 of the piston displacement in one of the cylinders 2. It is advantageous for each blow-around duct 10 to have a cross-section that is to a great extent constant in the sections 15 and 16 of the duct and that cross-section should lie in the range from 1.8 to 2.2 times the effective operating inlet area $A_{Eeff}$ provided when the gas-changing valve 11 is open. This effective operating inlet area $A_{Eeff}$ is different from case to case and must be determined by experiment for any given machine. It is less than the actual annular inlet area made available at the cylinder head between the closure surface and the seat surface of the valve when the gas-changing valve is fully opened, because of vortex effects, pressure differences and special geometric relations in the gas-exchange space adjacent to the gas-exchange valve seat. After determination of the magnitude of the effective operating inlet area $A_{Eeff}$ it is then possible, for a given piston displacement, to establish the shape and size of the blow-around duct 10 and of the gas-change channel 12 and thereafter to construct a physical embodiment. For the case of a blow-around duct 10 which tapers down in cross-section from the entrance plane 13, at or in the duct 7, as in the example shown in FIGS. 5 and 6, the blow-around duct 10 should have an average cross-sectional area in its regions 15 and 16 which here also should be in the range between 1.8 and 2.2 times the effective operating inlet area $A_{Eeff}$ provided when the gas-change valve 11 is fully open.

On the outlet side each blow-around duct 10 is preferably prolonged into the exhaust manifold 9 but only far enough for the discharge gases to be deflected in a manner favoring flow and with as little lost energy as possible so as to enable recovery of energy in the supercharging assembly 5 with the greatest possible efficiency. Each flow-around duct 10, however, instead of being prolonged into the exhaust manifold can also end at the outside of the exhaust manifold where it then just simply forms a junction. Independently of the nature of the exit end of the duct, each blow-around duct, at least in its region 17 between the cylinder head 4 and the exit plane at its exhaust manifold end has a broadening cross-section after the manner of a diffuser. As the various illustrative examples show, the individual blow-around ducts can branch off from the air charging manifold 7 either centrally or off-center. Furthermore, as shown in the various figures, they can branch off either at right angles or obliquely with respect to the longitudinal axis of the manifold 7.

Figure 2:
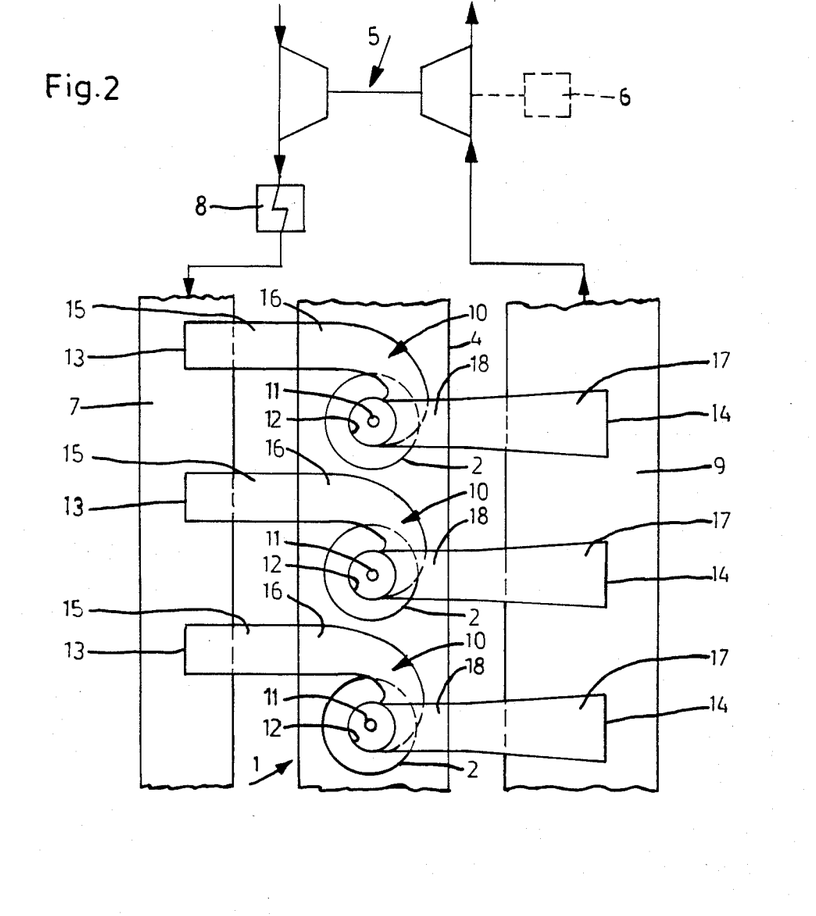
Figure 2A:
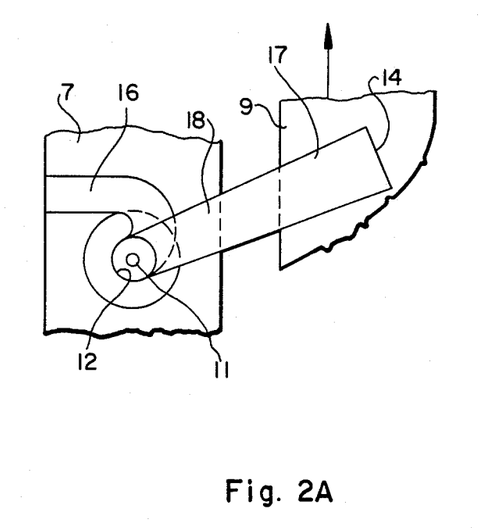
FIG. 2A shows a possible modification of portions of FIG. 2.
Figure 3:
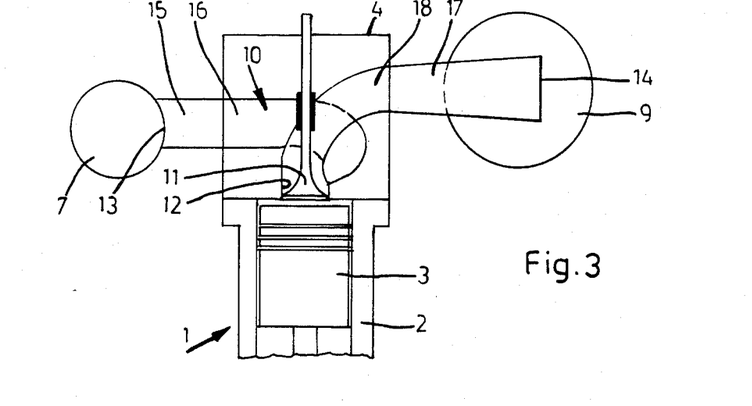
FIGS. 3 and 4 are similar corresponding views of a second embodiment of a four-stroke engine for explaining the invention.
Figure 4:
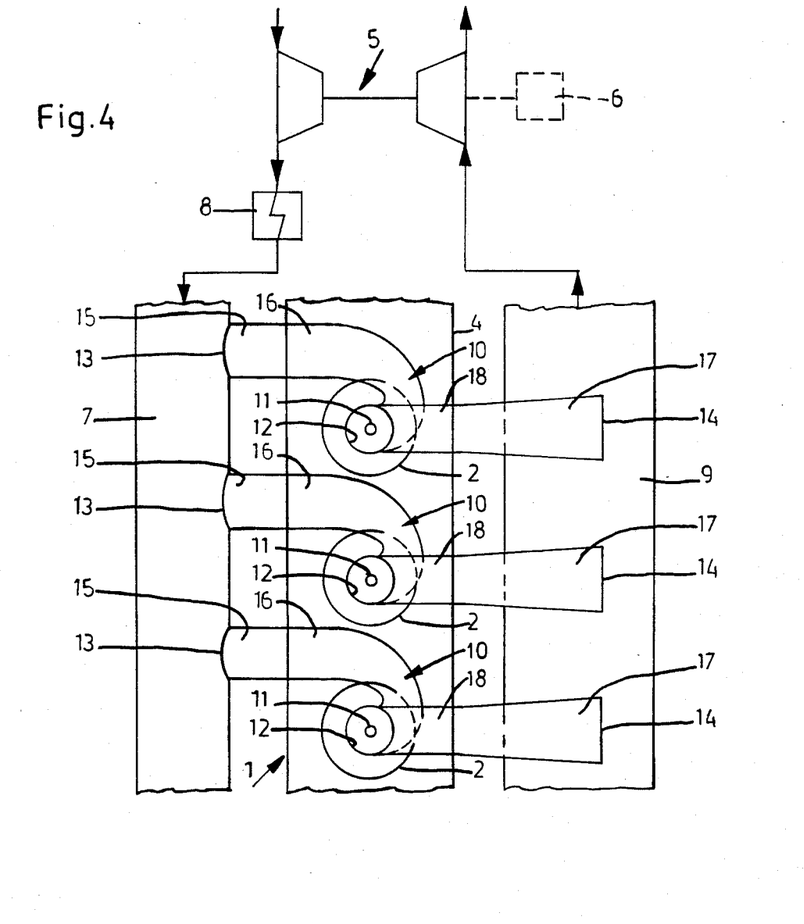
Figure 7:
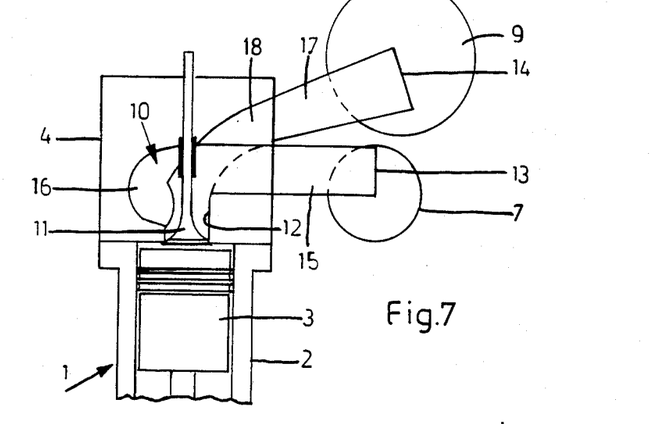
FIGS. 7 and 8 are similar corresponding views of a fourth embodiment of a four-stroke engine for explaining the invention.
Figure 8:
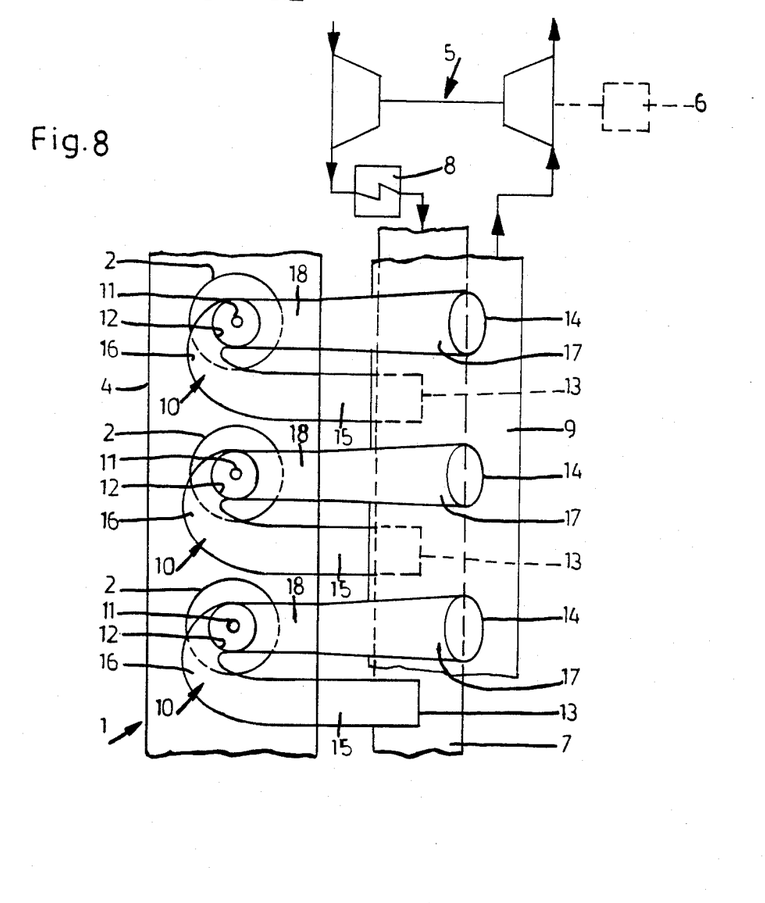

Similarly, the exit ends of the blow-around ducts 10 can be either perpendicular or oblique to the exhaust manifold 9. When they are oblique they discharge into the manifold from a direction pointing towards the supercharger assembly 5, as shown in FIG. 2a. The discharge into the manifold 9 can, again, be centrally into the manifold, or, as shown in FIG. 7, off-center.

In the examples given in FIGS. 1–8 a permanent connection is provided by the blow-around ducts 10 between the air-charging manifold 7 and the exhaust manifold 9, so that compressed air continuously flows at a certain rate from the manifold 7 to the manifold 9 with the consequence that an increased amount of working gas is continuously available for the supercharger assembly 5. In the embodiments shown in FIGS. 9 and 10 and in FIGS. 11 and 12 respectively this flow bypassing the cylinders is intermittent and in step with the piston strokes of the engine. This is implemented by the provision of a throttle member 19 for cyclical control of the air flowing into each of the blow-around ducts. In this case the sections 15 and 16 of each of the ducts 10 can vary more widely from the cross-sectional areas set forth above as being preferable.

Figure 9:
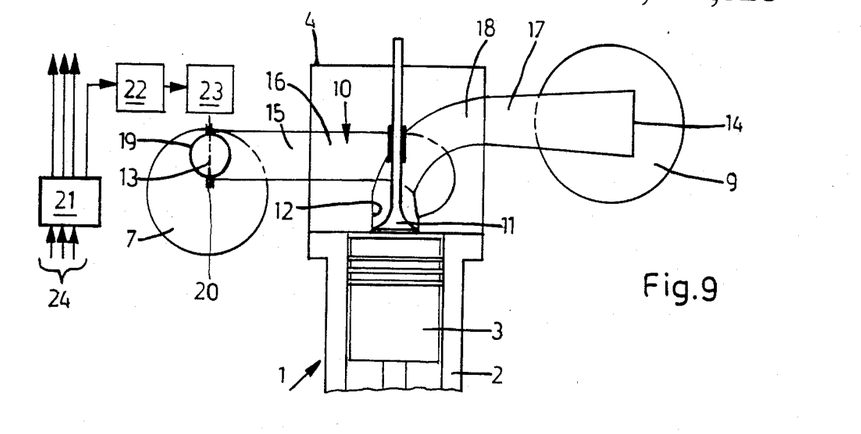
FIGS. 9 and 10 are corresponding views of a fifth embodiment of a four-stroke engine according to the invention.
Figure 10:
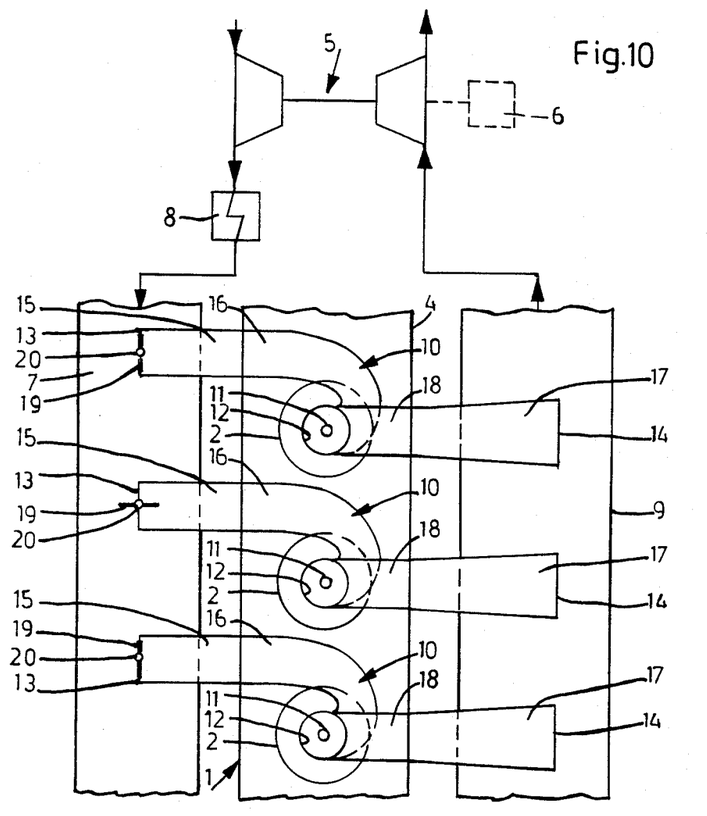
Figure 11:
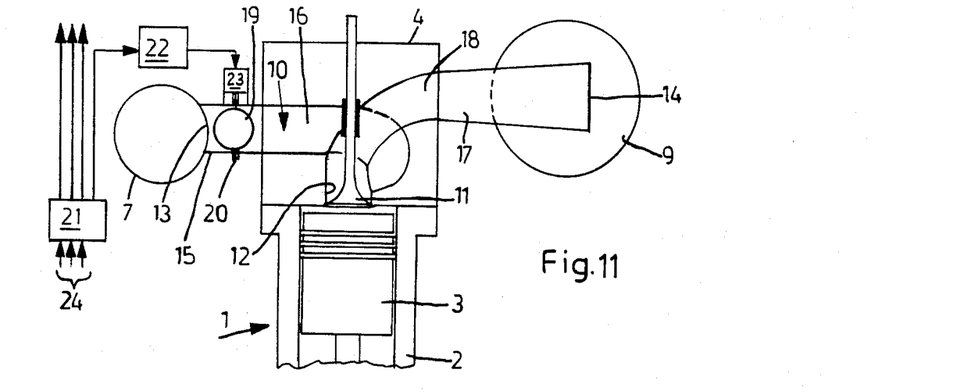
FIGS. 11 and 12 are corresponding views of a sixth embodiment of a four-stroke engine according to the invention.
Figure 12:
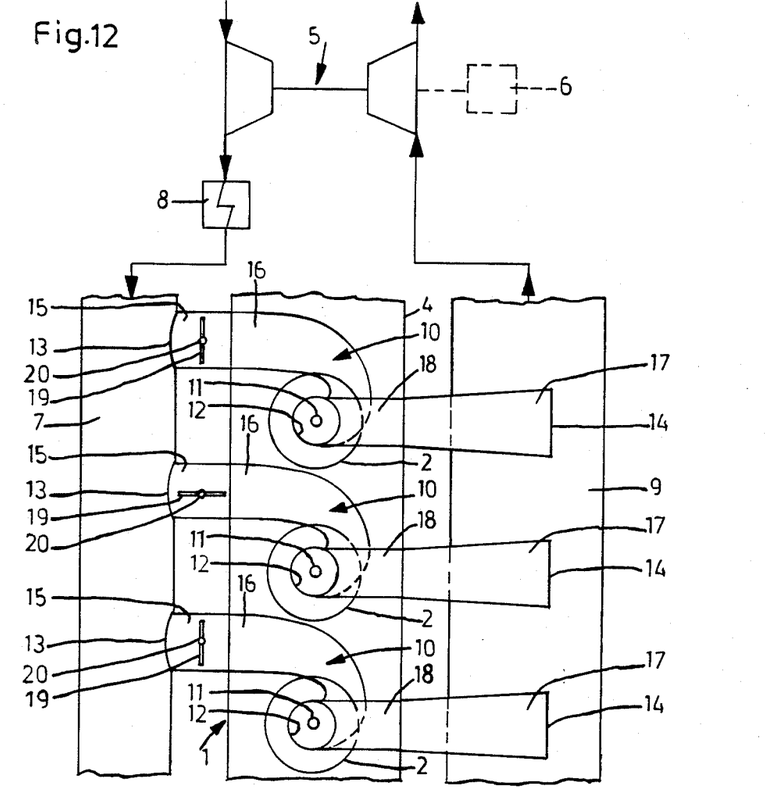

The throttle 19 can, as in the case of FIGS. 9 and 10 be at the entrance of each blow-around duct 10, in their respective entrance planes 13, or they can be, as shown, for example, in FIGS. 11 and 12, somewhat set back from the entrance plane 13 in the beginning region 15 of the duct. A simple butterfly valve, which can be swung symmetrically on the axle 20 passing through it, is advantageously used as the throttle in these cases. Each throttle member 19 makes possible a change of the setting of the cross-section of each blow-around duct 10 from full passage to minimum passage and vice versa. The throttle 19 is connected to a cyclic control system that includes a timing transducer 21 and a throttle-actuating apparatus 22,23. The actuation of the throttle 19 can be accomplished by the actuating element 23 mechanically, pneumatically, hydraulically or electrically. The portion 22 of the actuation device has the function of providing the necessary control forces for the mechanical, pneumatic, hydraulic or electrical device 23. A microprocessor is preferably used for the timing unit 21. It can operate on the basis of actual values reported to it over the reporting channels 24 regarding parameters that change with conditions of operation, which may involve values of engine power, engine speed, charging air pressure, pressure difference between the manifolds, turbine temperature or a combination of such parameters. The control of the throttles 19 is maintained in step with the four-stroke cycle control of the gas-change valve 11 and is also adjusted to the amount of air required in the blow-around ducts 10.

As already mentioned, when the gas-change valve 11 is closed it is desired to maintain air flow in the by-pass path (limited by the cross-section of that path), and when the gas-change valve is open it is desired to have a very low resistance to flow of air from the intake manifold to the cylinder during the intake stroke. During the exhaust stroke, however, the object of the invention is to produce a very low resistance for gas flowing out of the cylinder into the exhaust manifold. It is accordingly during the exhaust stroke that it is useful to close the throttle valve 19 to its minimum-passage or closed condition. That would prevent exhaust gas from backing up into the air supply manifold, especially at the beginning of the exhaust stroke when the pressure in the cylinder is relatively high. The microprocessor 21 can be used advantageously to time the opening and closing of the throttle valve(s) 19 because the pressure difference between the mainfolds 9 and 7, already mentioned as being reported to the microprocessor 21 over channels 24, may be a better fine timing criterion for all engine speeds than the alternative of timing control based on crankshaft position.

By means of the blow-around ducts 10 provided in accordance with the present invention and their special design, the super-charged air can flow with low resistance into the cylinders in such a way that a vortex is produced, while exhaust gas still can flow out with little resistance. When the gas-changing valve 11 is closed, a direct air current from the air manifold 7 to the exhaust gas manifold 9 is opposed by an increased resistance in the specially constituted portion of the blow-around duct 10 within the cylinder head 4, with the result that although a certain amount of air can bypass the cylinder, the pressure of the air in the charging air manifold 7 does not sink below a certain desired level. The gas-changing valve 11 can be seated either directly in the cylinder head 4 or in a valve basket inserted therein which also includes parts a blow-around duct 10 and a gas-change channel 12. The gas-changing valve 11 itself is connected to a control drive not shown in the drawing which provides for engine-synchronous actuation of the valves in one of the conventional ways of so doing.

Although the invention has been described with reference to certain illustrative examples, it will be understood that variations and modifications are possible within the inventive concept.

What is claimed is:

1. Four-stroke multicylinder supercharged internal combustion engine with a supercharger driven at least in part by engine exhaust gas, having an air-charging manifold connected for supplying air from said supercharger to the engine cylinders for combustion of fuel injected therein, an exhaust gas collecting manifold connected to said cylinders and to said supercharger, and ducts interconnecting said manifolds and valved ports of said cylinders, said ducts being so constituted that for each cylinder (2) there is provided a blow-around duct connected at one end to said air-charging manifold and at its other end to said exhaust manifold, having curved portions respectively leading to and leading away from a port of said cylinder, passing through a cylinder-head structure (4) and connecting to a short gas-change channel (12) which branches off said blow-around duct and connects to said port, a single gas-changing valve (11) being provided at said port in said gas-change channel (12) for said cylinder, through which valve and channel the air necessary for combustion in said cylinder can be charged into said cylinder and the gases to be exhausted can be propelled out of said cylinder, said blow-around duct (10, 13, 14, 15, 16, 17, 18) being so shaped that, for increase of the effective working gas quantity in said supercharger, an appreciable amount of air can be blown from said air-charge manifold, around said said curved duct portions in succession, to said exhaust gas manifold against a resistance to air flow through and between said curved portions such that when said valve (11) is closed, a limited amount of air can pass, as a result of pressure difference between said manifolds, from said air-charge manifold (7) to said exhaust manifold (9), said blow-around duct and said gas-exchange channel being also shaped so that, when said valve (11) is open, charging air can flow from said air-charging manifold into said cylinder with little resistance to flow during the intake stroke of a piston in said cylinder and exhaust gas can flow out of said cylinder into said exhaust manifold with little resistance to flow during the exhaust stroke of said pistin, controllable throttle means (19) being provided in each said blow-around duct at or near its inlet end, said throttle means being in each case capable of being operated to vary the local cross section of said blow-around duct between full and minimum passage cross section, and timed operating means being provided for said throttle means, comprising timing (21) and actuating means (22, 23) for said throttle means (19) for opening and closing the respective blow-around ducts in accordance with the piston stroke cycle of the respective cylinders.

2. Supercharged engine according to claim 1, in which each said blow-around duct has a portion (15) of uniform cross-secton extending at least between its entrance plane (13) at the side of said air-charging manifold and its entrance to said cylinder head structure (4) and in which each said blow-around duct, from its said entrance plane (13) at its end connecting with said air-charging manifold (7) over to the location of braching off of said gas-change channel (12) has a cross-sectional area that is substantially constant and of a magnitude between 1.8 and 2.2 times the effective working inlet cross-setion ($A_{Eff}$) of said cylinder port when said gas-changing valve (11) is fully open.

3. Supercharged engine according to claim 1, in which each said blow-around duct tapers down in cross-section from its entrance plane at its end connecting to said air-charging manifold and in which the tapering down portion of each blow-around duct has an average cross-sectional area lying between 1.8 and 2.2 times the effective working inlet cross-section ($A_{Eff}$) of said cylinder port when said gas-changing valve (11) is fully open.

4. Supercharged engine according to claim 1, in which the volume of that portion of each said blow-around duct lying between the entrance plane (13) thereof at its end connecting with said air-charging manifold and the branching location of said gas-change channel (12) corresponds at least approximately to seven tenths of the piston displacement of the cylinder (2) to which its said branch channel (12) connects.

5. Supercharged engine according to claim 1, in which the outlet end of each said blow-around duct is prolonged into the interior of said exhaust manifold (9) and in which at least in its region (17) between said cylinder head structure (4) and it exit plane (14) at its end connecting with said exhaust manifold (9) each said blow-around duct is shaped in the manner of diffuser with a cross-section broadening towards said exit plane.

6. Supercharged engine according to claim 1, in which each said blow-around duct discharges into said exhaust manifold substantially perpendicularly to the longitudinal axis of the latter.

7. Supercharged engine according to claim 1, in which each said blow-around duct discharges into said exhaust manifold obliquely to the longitudinal axis of said exhaust manifold at an angle inclined towards said supercharger (5).

8. Supercharged engine according to claim 1, in which each said blow-around duct has a discharge portion directed toward the longitudinal axis of said exhaust manifold (9).

9. Supercharged engine according to claim 1, in which each said blow-around duct has a discharge portion, for discharge into said exhaust manifold, having an axis directed for an off-set from the longitudinal axis of said exhaust manifold.

10. Supercharged engine according to claim 1, in which said gas-change channel (12) branching off from each said blow-around duct runs coaxially with the axis said gas-change valve (11).

11. Supercharged engine according to claim 1, in which the axis of said gas-change channel (12) and the axis of that portion (17, 18) of the blow-around duct from which said channel branches, lying between the branching place and the exit plane (14) at the exhaust gas manifold end of said duct, lie in a plane which also contains the longitudinal axis of said gas-changing valve (11).

12. Supercharged engine according to claim 1, in which that portion (18) of each said blow-around duct located between its exit (14) leading into said exhaust gas manifold and the branching place of said gas-change channel (12) within said cylinder head structure (4) has a streamline-configured transition portion connecting with said gas exchange channel (12).

13. Supercharged engine according to claim 1, in which that portion (15, 16) of each said blow-around duct located between its entry (13) connecting with said air-charging manifold and said branching place of said gas-channel (12) is wound around spirally within said cylinder head structure and discharges above said branching place laterally into said portion (18) of said blow-around duct which leads to said exhaust manifold (9) in such a way that said spirally wound portion above said branching place provides the necessary resistance to flow for a desired operation of combined air bypass and cylinder recharging.

14. Supercharged engine in accordance with claim 1, in which said throttle means (19) for each said blow-around duct are constituted as a butterfly valve.

* * * * *